United States Patent [19]

Knight

[11] Patent Number: 4,673,222

[45] Date of Patent: Jun. 16, 1987

[54] TRACTOR AIR PRESSURE BRAKING SYSTEM

[75] Inventor: David J. Knight, Avon Lake, Ohio

[73] Assignee: Allied Corporation, Morristown, N.J.

[21] Appl. No.: 824,749

[22] Filed: Jan. 31, 1986

[51] Int. Cl.$^4$ ............................................. B60T 13/00
[52] U.S. Cl. ......................................... 303/9; 303/13; 303/71
[58] Field of Search .............................. 303/9, 73, 71

[56] References Cited

U.S. PATENT DOCUMENTS

| | | | |
|---|---|---|---|
| 3,503,651 | 3/1970 | Gachot et al. | 303/13 |
| 4,003,605 | 1/1977 | Fannin | 303/9 X |
| 4,348,062 | 9/1982 | Koenig | 303/13 X |
| 4,368,926 | 1/1983 | Bartholdmer | 303/13 X |

Primary Examiner—Duane A. Reger
Assistant Examiner—Matthew C. Graham

Attorney, Agent, or Firm—Ken C. Decker; W. N. Antonis

[57] ABSTRACT

A fluid pressure braking system for a heavy vehicle is provided with a supply reservoir and a pair of service reservoirs which are charged from the supply reservoir through a corresponding pair of pressure protection valves. The emergency/parking braking system is charged directly from the supply reservoir through a pressure protection valve which is set to open at a pressure level greater than that at which the pressure protection valves protecting the service reservoirs open. Accordingly, it is not possible to release the emergency spring brakes until the service reservoirs are charged to a safe operating level, and it is not possible to bleed down both of the service reservoirs and to thereby effect an emergency brake application due to a single failure in the systems.

8 Claims, 1 Drawing Figure

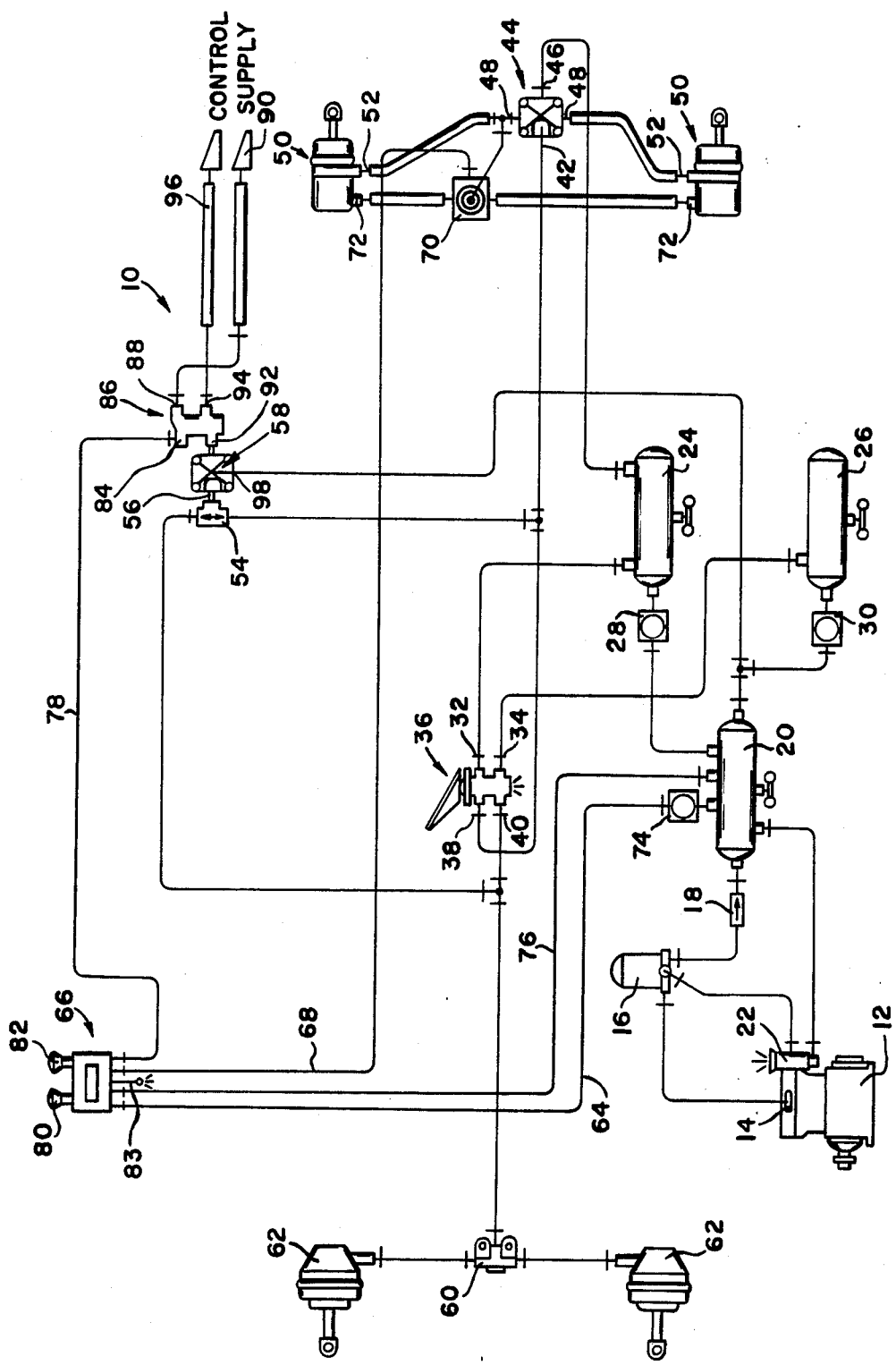

TRACTOR AIR PRESSURE BRAKING SYSTEM

This invention relates to a fluid pressure braking system for a heavy duty vehicle.

Heavy trucks are normally equipped with air braking systems. Pursuant to governmental regulations, air brake systems used on heavy trucks must include a split service braking system, and must also include an emergency braking system which is capable of stopping the vehicle during a failure of the service braking system. The emergency braking system on most vehicles includes spring-actuated, air pressure released emergency brake actuators. These actuators are normally fitted on the rear wheels of the tractor and on all wheels of the trailer in tractor-trailer combination vehicles. The spring brakes on the trailer are charged through a supply line which interconnects the tractor and trailer.

Such air brake systems further include an air compressor which is operated by the vehicle engine, which charges a supply reservoir. Two service reservoirs are communicated to the supply reservoir. A dual brake valve is connected to each of the service reservoirs to effect application of the vehicle service brakes. Hold-off pressure is communicated to the emergency system through a double check valve communicated to each of the service reservoirs. Accordingly, if a failure occurs in the emergency braking system anywhere downstream of this double check valve, this single failure can cause automatic application of the spring brakes, since both of the service reservoirs are communicated to the emergency system through the common double check valve. Obviously, it is undesirable to effect an automatic spring brake application if only a single failure in one of the service braking circuits exists, since the vehicle would then be totally disabled in an often inconvenient or dangerous place. Accordingly, it is desirable to eliminate automatic application of the emergency brakes when a single failure in one of the systems occurs.

A typical prior art braking system is illustrated in U.S. Pat. No. 4,139,238, issued Feb. 13, 1979 to Hoffman. This patent illustrates a so-called "European" braking system, in which a relatively expensive and complex multi-circuit relay valve controls communication through the emergency braking system. Accordingly, the present invention has the advantage of preventing automatic application of the vehicle emergency brakes in response to a single failure of the service braking circuits, without requiring a complicated and expensive multi-circuit protection valve used in European type systems.

These and other advantages of the invention will become apparent from the following specification, with reference to the accompanying drawing, the sole FIGURE of which is a schematic illustration of a braking system made pursuant to the teachings of my present invention.

Referring now to the drawing, a vehicle fluid pressure braking system generally indicated by the numeral 10 includes an air compressor 12 which is operated by the vehicle engine. The outlet or delivery port 14 of the air compressor 12 is communicated to an air dryer 16 and to a supply reservoir generally indicated by the numeral 20 through a one-way check valve 18. A conventional governor 22 is responsive to the pressure level in supply reservoir 20 to unload the compressor 12 when the pressure in reservoir 20 attains a predetermined level. The governor 22 includes an outlet which is communicated to the air dryer 16 for purging the latter in a manner well known to those skilled in the art. Reservoir 20 is communicated to service reservoirs 24, 26 through corresponding pressure protection valves 28, 30. Pressure protection valves 28, 30 are conventional, and are used to control the pressure level communicated into the reservoirs 24, 26. The pressure protection valves 28, 30 are set so that they remain closed, thus preventing communication into their corresponding reservoirs, until the pressure level communicated to the inlet of valves 28, 30 attains a predetermined level. Accordingly, the valves 28, 30 prevent charging of the reservoirs 24, 26 until the supply reservoir 20 is charged to the predetermined level. At pressure levels above the predetermined level, the pressure protection valves 28, 30 function as one-way check valves, permitting communication into the reservoirs 24, 26 but preventing communication in the reverse direction.

The reservoirs 24, 26 are each communicated to respective supply ports 32, 34 of a conventional dual brake valve generally indicated by the numeral 36. The valve 36 may, for example, be made pursuant to the teachings of U.S. Pat. No. 3,580,646, issued May 25, 1971 to Ternent. When a brake application is effected, the valve 36 is operated, thereby communicating the supply port 32 with a corresponding delivery port 38 and communicating supply port 34 with a corresponding delivery port 40. When the brakes are released, the ports 38, 40 are vented to atmosphere.

Delivery port 38 of dual brake valve 36 is communicated to the control port 42 of a conventional relay valve generally indicated by the numeral 44. Valve 44 includes a supply port 46 which is communicated to the reservoir 24 and delivery ports 48, which are communicated to the service ports 52 of conventional combined service and spring brake actuators generally indicated by the numeral 50. Accordingly, when a pressure signal is transmitted to control port 42 upon operation of the brake valve 36, fluid pressure is supplied from the service reservoir 24 to service ports 52 of actuators 50, to thereby effect a service brake application. The delivery port 40 is also communicated through a double check valve 54 to the control port 56 of a conventional relay valve 58. The other side of the double check valve 54 is communicated to the delivery port 40 of the brake valve 36, which is also communicated through quick release valve 60 to the front service brake actuators 62.

Pursuant to the invention, the fluid pressure supply for the emergency/parking braking system, and the supply line to the trailer if the system 10 is used on the tractor portion of a tractor-trailer combination vehicle, is fed directly from the supply reservoir 20. Supply reservoir 20 is communicated with a conduit portion 64 which is communicated through a modular control valve 66 to conduit portion 68. Conduit portion 68 is communicated through an anti-compounding quick release valve 70 to spring brake ports 72 of the actuators 50. The quick release valve 70 is conventional, and is provided with a connection to the port 48 of relay valve 44 to assure that the service brakes cannot be applied at the same time the spring brakes are applied, which may result in damage to the vehicle brakes.

The conduit portion 64 is fed through a pressure protection valve 74, which is identical to the pressure protection valves 28, 30, except that it is set to open at a substantially higher pressure than are the valves 28 and 30. Another conduit section 76 is fed directly from supply reservoir 20, and is communicated through the modular control valve 66 to conduit portion 78. The modular control valve 66 may be made pursuant to U.S. Pat. No. 4,330,157 issued May 18, 1982 to Sebo, but with two separate supply connections, one for each of the conduit portions 64, 76. Modular control valve 66 is provided with two separate control plungers 80, 82. Control plunger 80 controls communication between the conduit portions 64, 68 to therefore control communication between the supply reservoir 20 and the spring brake ports 72. Control plunger 82 controls communication between conduit portions 76 and 78 and therefore controls communication between the supply reservoir 20 and the supply line inlet port 84 of a conventional tractor protection valve generally indicated by the numeral 86. When valve plungers 80, 82 are pushed in, communication between the corresponding conduit portions is initiated, and when the plungers 80, 82 are pulled out, communication between the corresponding conduit portions is broken. However, the modular control valve 66 is so designed that when plunger 80 is pulled out to thereby vent the spring brake ports 72 to exhaust port 83, valve plunger 82 automatically pops out to also vent the supply port 84 of the tractor protection valve 86.

Tractor protection valve 86 is conventional and normally communicates port 84 with an outlet port 88 when the air brake system functions normally, and therefore communicates the conduit portion 78 with the trailer supply line 90. Supply line 90 communicates supply air to the trailer (assuming that the system 10 is used on the tractor portion of a tractor-trailer vehicle). Air communicated through supply line 90 charges the reservoirs carried by the trailer and also supplies fluid pressure to hold off the spring brakes of the trailer, in a manner well known to those skilled in the art. Tractor protection valve 86 further includes a control inlet port 92 and a control outlet port 94 which is communicated to the trailer control line 96. Pressure signals transmitted through control line 96 effect a trailer service brake application in a manner well known to those skilled in the art. Port 92 is communicated to the delivery port of the relay valve 58. Relay valve 58 further includes a supply port 98, which is connected directly to the supply reservoir 20.

In operation, and assuming that the vehicle is parked with the spring brakes applied such that the supply line 90 and the spring brake ports 72 are vented, operation of the air compressor 12 supplies compressed air to the supply reservoir 20. Air pressure builds up in the supply reservoir 20, but cannot immediately communicate to the service reservoirs 24, 26 because the pressure protection valves 28, 30 are closed. Similarly, the pressure in reservoir 20 cannot be used to release the tractor spring brakes because the pressure protection valve 74 is also closed. When pressure builds up in supply reservoir 20 to the pressure at which the pressure protection valves 28, 30 open, the reservoirs 24, 26 are charged with fluid pressure. However, since the opening pressure of pressure protection valve 74 is set substantially higher than the opening pressure of pressure protection valves 28, 30, fluid pressure cannot be communicated to the spring brake ports 72 of actuators 50 until the pressure builds up in service reservoirs 24, 26 to a pressure level sufficient to effect a service brake application.

Assuming that both of the plungers 80, 82 have been pushed in, the pressure level in the supply reservoir 20 (and therefore the pressure level in service reservoirs 24, 26, due to the fact that the pressure protection valves 28, 30 have opened) builds up to a pressure level sufficient to open the pressure protection valve 74. Fluid pressure is communicated from the supply reservoir 20 to the spring brake ports 72 on the actuators 50. Simultaneously, fluid pressure is communiated to the supply line 90 through conduit sections 76, 78 and the tractor protection valve 86. The vehicle may now be driven.

When a service brake actuation is effected, the dual brake valve 36 is operated, thereby communicating pressure from the service reservoirs 24, 26 to the front service brake actuator 62 and to the service brake ports 52 of the actuators 50. At the same time, a control signal is also transmitted through the double check valve 54 to the control port 56 of the relay valve 58, thereby causing the port 92 of the tractor protection valve 86 to be communicated with the supply reservoir 20. Accordingly, a signal is transmitted through the control line 96 to actuate the trailer service brakes.

In the event of a failure of the service brakes, or when the vehicle is parked, the operator pulls out the plungers 80, 82, thereby terminating fluid communication between the corresponding conduit portions and venting the conduit portions 68, 78, thereby venting the trailer supply line 90 and also venting the spring brake port 72 of actuators 50, thereby assuring a spring brake application of both the tractor and the trailer spring brakes.

It will be noted that, in contrast to prior art braking systems, there is no point common to both the service and emergency braking systems except the supply reservoir 20, which is amply protected by pressure protection valves. Accordingly, there is no downstream failure point common to both service brake systems, thereby preventing fluid pressure from escaping from both service brake systems due to a single failure. Accordingly, it is not possible for the emergency spring brakes to apply in the event of only a single failure in one of the service braking systems, even when the system that has not suffered a failure is depleted through normal operation. Accordingly, the spring brakes are never automatically applied as a result of a single failure in either of the service braking systems. However, once the vehicle has been parked and the spring brakes are set manually, it is not possible to release the spring brakes with a failure in either of the service braking systems, the spring brakes cannot be released until the failure is repaired, since the higher opening pressure of valve 74 does not allow charging of the spring brakes until both service reservoirs 24 and 26 are charged above the predetermined pressure required to open both pressure protection valves 28, 30. If either service system has failed, it would be impossible to charge the corresponding reservoir above the higher pressure required to open valve 74, thus precluding charging of the spring brakes. Furthermore, as described hereinabove, the setting or failure of the spring brake system on the tractor will automatically cause the plunger 82 to pop out to thereby set the trailer spring brakes, but a failure of the trailer spring brakes will not automatically set the spring brakes on the tractor.

I claim:

1. Fluid pressure braking system comprising first and second sets of fluid pressure operated service brakes, a set of fluid pressure responsive emergency brakes, a fluid pressure source, a supply reservoir communicated with said fluid pressure source, a pair of service reservoirs, first and second conduits separately communicating each of said service reservoirs with said supply reservoir, first and second pressure protection valves located in said conduits for preventing pressure communication from said supply reservoir into said service reservoirs until the pressure level in said supply reservoir attains a predetermined level, and means for communicating each of said service reservoirs with a corresponding set of said service brakes, said communicating means including operator-actuated valve means for substantially simultaneously communicating said first and second sets of service brakes with their corresponding service reservoirs, third conduit means for communicating said supply reservoir with said emergency brakes, said third conduit means being independent and separate from both of said service reservoirs and said first and second pressure protection valves, and a third pressure protection valve in said third conduit for preventing communication from said supply reservoir to said emergency brakes until the pressure level in said supply reservoir attains a predetermined level, the pressure level at which said first and second pressure protection valves initiate communication between said supply reservoir and said service reservoirs being less than the pressure level at which said third pressure protection valve initiates communication with said emergency brakes.

2. Fluid pressure braking system as claimed in claim 1, a supply line communicated with said supply reservoir, operator-actuated valve mechanism controlling communication through said third conduit means and to said supply line, and a valve device responsive to said operator-actuated valve means to communicate said control line with the supply reservoir.

3. Fluid pressure braking system comprising first and second sets of fluid pressure operated service brakes, a set of fluid pressure responsive emergency brakes, a fluid pressure source, a supply reservoir communicated with said fluid pressure source, a pair of service reservoirs, first and second conduits separately communicating each of said service reservoirs with said supply reservoir, first and second pressure protection valves located in said conduits for preventing pressure communication from said supply reservoir into said service reservoirs until the pressure level in said supply reservoir attains a predetermined level, and means for communicating each of said service reservoirs with a corresponding set of said service brakes, said communicating means including operator-actuated valve means for substantially simultaneously communicating said first and second sets of service brakes with their corresponding service reservoirs, third conduit means for communicating said supply reservoir with said emergency brakes, said third conduit means being independent and separate from both of said service reservoirs and said first and second pressure protection valves, and a third pressure protection valve in said third conduit for preventing communication from said supply reservoir to said emergency brakes until the pressure level in said supply reservoir attains a predetermined level, said emergency brakes being spring actuated which are released by fluid pressure, the pressure level at which said first and second pressure protection valves initiate communication between said supply reservoir and said service reservoirs being less than the pressure level at which said third pressure protection valve initiates communication with emergency brakes, whereby fluid pressure cannot be communicated to release said emergency brakes until the pressure level in said service reservoirs attains a safe operating level.

4. Fluid pressure braking system comprising first and second sets of fluid pressure operated service brakes, a set of fluid pressure responsive emergency brakes, a fluid pressure source, a supply reservoir communicated with said fluid pressure source, a pair of service reservoirs, first and second conduits separately communicating each of said service reservoirs with said supply reservoir, first and second pressure protection valves located in said conduits for preventing pressure communication from said supply reservoir to said service reservoirs until the pressure level in said supply reservoir attains a predetermined level, and means for communicating each of said service reservoirs with a corresponding set of said service brakes, said communicating means including operator-actuated valve means for substantially simultaneously communicating said first and second sets of service brakes with their corresponding service reservoirs, third conduit means for communicating said supply reservoir with said emergency brakes, said third conduit means being independent and separate from both of said service reservoirs and said first and second pressure protection valves, and a third pressure protection valve in said third conduit for preventing communication from said supply reservoir to said emergency brakes until the pressure level in said supply reservoir attains a predetermined level, and fourth conduit means communicated with said supply reservoir, said fourth conduit means being communicated to a supply line.

5. Fluid pressure braking system as claimed in claim 4, wherein operator-actuated valve mechanism is provided in said third and fourth conduit means to separately control fluid communication therethrough, but automatically venting said third conduit when the fourth conduit is vented.

6. Fluid pressure braking system as claimed in claim 4, and a control line communicated with said operator-actuated valve means through a relay valve having a supply port communicated with said supply reservoir through a fifth conduit, a delivery port communicated with said control line, and a control port communicated with the operator-actuated valve means.

7. Fluid pressure braking system as claimed in claim 6, wherein the pressure level at which said first and second pressure protection valves initiate communication between said supply reservoir and said service reservoirs is less than the pressure level at which said third pressure protection valve initiates communication with said emergency brakes.

8. Fluid pressure braking system as claimed in claim 4, wherein the pressure level at which said first and second pressure protection valves initiate communication between said supply reservoir and said service reservoirs is less than the pressure level at which said third pressure protection valve initiates communication with said emergency brakes.

* * * * *